(12) United States Patent
Schmidt

(10) Patent No.: US 10,962,214 B2
(45) Date of Patent: Mar. 30, 2021

(54) WIRELESS OBSTRUCTION BEACON

(71) Applicant: Dialight Corporation, Farmingdale, NJ (US)

(72) Inventor: Keld Schmidt, Bagsvaerd (DK)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 16/423,991

(22) Filed: May 28, 2019

(65) Prior Publication Data
US 2019/0368709 A1 Dec. 5, 2019

Related U.S. Application Data

(60) Provisional application No. 62/677,478, filed on May 29, 2018.

(51) Int. Cl.
| B60R 1/12 | (2006.01) |
| F21V 23/02 | (2006.01) |
| F21V 7/06 | (2006.01) |
| H02J 50/10 | (2016.01) |
| G08G 5/04 | (2006.01) |
| G08G 3/02 | (2006.01) |
| G08B 5/36 | (2006.01) |
| F21W 111/00 | (2006.01) |
| F21Y 115/10 | (2016.01) |

(52) U.S. Cl.
CPC .............. F21V 23/026 (2013.01); F21V 7/06 (2013.01); G08B 5/36 (2013.01); G08G 3/02 (2013.01); G08G 5/04 (2013.01); H02J 50/10 (2016.02); F21W 2111/00 (2013.01); F21Y 2115/10 (2016.08)

(58) Field of Classification Search
CPC ........ F21V 23/026; F21V 7/06; F21V 23/045; H02J 50/10; G08G 5/04; G08G 3/02; G08G 5/0026; G08G 5/045; G08B 5/36; G08B 7/062; G08B 7/066; F21Y 2115/10; F21W 2111/00; F21W 2111/06
See application file for complete search history.

(56) References Cited

U.S. PATENT DOCUMENTS

| 2005/0017751 | A1 | 1/2005 | Gunn et al. | |
| 2007/0228999 | A1* | 10/2007 | Kit | H05B 45/10 315/291 |
| 2012/0257385 | A1* | 10/2012 | Peck | F21V 31/005 362/235 |
| 2012/0319871 | A1 | 12/2012 | Wise | |

(Continued)

OTHER PUBLICATIONS

International Search Report and Written Opinion of corresponding PCT Application No. PCT/US19/034177, dated Aug. 27, 2019, 7 pages.

Primary Examiner — Rajarshi Chakraborty
Assistant Examiner — Glenn D Zimmerman

(57) ABSTRACT

The present disclosure is directed to examples of a warning beacon light. In one embodiment, the warning beacon light includes at least one light redirection component, a plurality of light emitting diodes (LEDs) positioned relative to the light redirection component such that light emitted from the plurality of LEDs is collimated to within a predefined range relative to a light emitting axis, and a wireless power transfer system coupled to the plurality of LEDs to provide power to the plurality of LEDs.

8 Claims, 5 Drawing Sheets

(56) References Cited

U.S. PATENT DOCUMENTS

| | | | |
|---|---|---|---|
| 2013/0081337 A1* | 4/2013 | Zavitz | E04H 12/344 |
| | | | 52/123.1 |
| 2014/0185280 A1 | 7/2014 | Peck | |
| 2014/0246924 A1 | 9/2014 | Proud | |
| 2015/0023023 A1* | 1/2015 | Livesay | H01L 33/50 |
| | | | 362/294 |
| 2015/0257229 A1* | 9/2015 | Wassel | H05B 47/19 |
| | | | 315/307 |
| 2017/0104374 A1 | 4/2017 | Zeine et al. | |
| 2019/0069379 A1* | 2/2019 | Kastee | G05D 1/08 |

* cited by examiner

WIRELESS OBSTRUCTION BEACON

CROSS REFERENCE TO RELATED APPLICATIONS

This application claims priority under 35 U.S.C. § 119(e) to U.S. provisional patent application Ser. No. 62/677,478, filed on May 29, 2018, which is hereby incorporated by reference in its entirety.

BACKGROUND

Lighting can be used for a variety of applications. Some lights can be used to illuminate a room, provide indication lights, as warning signals, and the like. Generally, lights are connected to a power source to power the lighting within a luminaire. The connection is typically a wired connection to the power source to power the light.

SUMMARY

In one embodiment, the present disclosure provides a warning beacon light. In one embodiment, the warning beacon light comprises at least one light redirection component, a plurality of light emitting diodes (LEDs) positioned relative to the light redirection component such that light emitted from the plurality of LEDs is collimated to within a predefined range relative to a light emitting axis, and a wireless power transfer system coupled to the plurality of LEDs to provide power to the plurality of LEDs.

In one embodiment, the present disclosure provides a lighting system. In one embodiment, the lighting system comprises a tower, a base coupled to the tower, wherein the base comprises a wireless transmitter coil to transmit power wirelessly, and a warning beacon light coupled to the tower and within a predefined distance to the base, wherein the warning beacon light comprises a wireless receiver coil to receive the power wirelessly from the wireless transmitter coil.

In one embodiment, the present disclosure provides a method for installing a warning beacon light. In one embodiment, the method comprises coupling a base with a wireless transmitter coil to a portion of a structure where the warning beacon light is to be installed to warn aircraft, coupling the warning beacon light to the portion of the structure, wherein the warning beacon light is positioned to place a wireless receiver coil in the warning beacon light to be within a predefined distance from a wireless transmitter coil in the base, and generating an electromagnetic flux between the wireless transmitter coil and the wireless receiver coil to generate power to operate a plurality of light emitting diodes in the warning beacon light.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a wireless obstruction beacon for tall structures and towers. As noted above, different lights may be used for different applications. However, many lights are currently powered via a wired connection to a power source.

The wired connection may be cumbersome and make it difficult to install warning beacon lights on top of structures, sky scraper buildings, towers, antenna structures, wind turbines, and the like, that may be several hundreds of feet high. The wires that are run through the tall structures to provide power to the warning beacon lights may be very thick and heavy. In addition, the warning beacon lights may be relative large and heavy as well. Thus, it may be difficult for a technician to carry the heavy warning beacon light up the tower and maneuver the wiring and the warning beacon to connect the warning beacon to the wires and power source.

Embodiments of the present disclosure provide a warning beacon light that includes a wireless power transfer. As a result, a base, or multiple bases, with a wireless power transmitter may be installed on the tower or high structure first. Then, the warning beacon light with the wireless power receiver may be attached to the structure near the base such that the base may wireless provide power to the warning beacon light. As a result, the structure may be configured with a variety of different warning lights, attached to a standard base, and the warning beacon lights of the present disclosure may be easier to install, repair, replace, and the like.

In addition, the warning beacon light of the present disclosure may include wireless communication or data connections. Thus, the amount of wired connections between the base and the warning beacon light may be eliminated. The wireless data connections may provide remote monitoring and control of the warning beacon lights.

Figure 1:
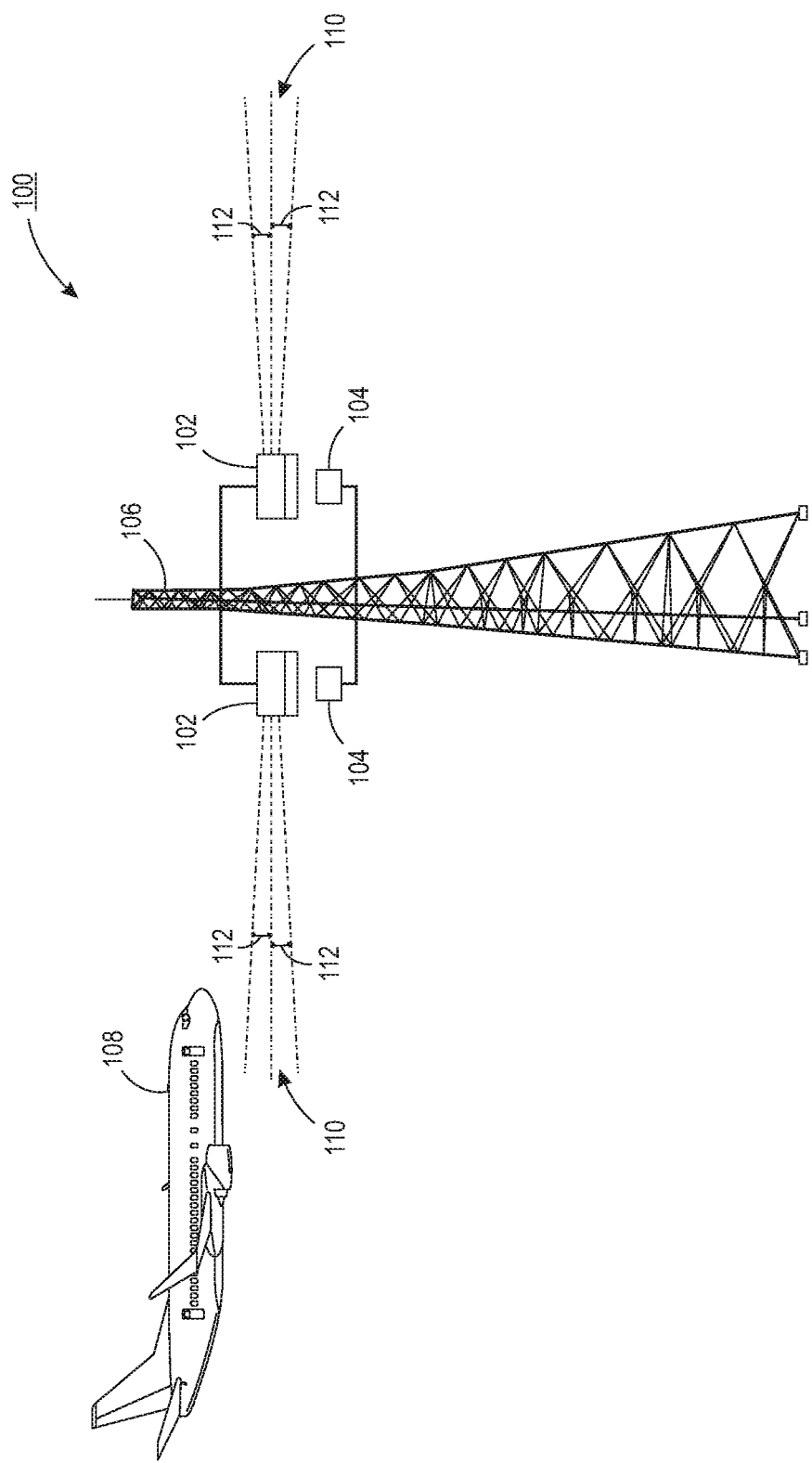
FIG. 1 depicts a block diagram of one embodiment of an example of a structure with a warning beacon light having wireless power transfer.

FIG. 1 illustrates an example of a system 100 that includes a wireless beacon light or warning beacon light 102 and a base 104 attached to a structure 106. In one embodiment, the wireless beacon light 102 and the base 104 may include a wireless power transfer system, as discussed in further details below and illustrated in FIGS. 2 and 3.

In one example, the wireless beacon light 102 may be a light that is intended to warn aircraft 108 of the structure 106. For example, the structure 106 may be a very tall tower, antenna, building, wind turbine, or any other type of structure. For example, the structure 106 may be over 100 feet tall.

In other words, the wireless beacon light 102 of the present disclosure is not a standard luminaire used to illuminate a room, a factory, or the inside of any other structure. The wireless beacon light 102 is also not an indicator light of low wattage.

Rather, the wireless beacon light 102 is a light that is designed to meet a particular standard for lights that are attached to tall structures. In other words, the wireless beacon light 102 may be a warning beacon light to mark tall structures for the aircraft 108.

For example, the wireless beacon light 102 may be designed to meet the standards of the Federal Aviation Administration (FAA) (e.g., the FAA AC regulations), the International Civil Aviation Organization (ICAO) (e.g., Annex 14), the International Association of Marine Aids to Navigation and Lighthouse Authorities (IALA) (e.g., the marine recommendations), and the like. The wireless beacon light 102 may also be designed to meet standards for a particular country such as the Service Technique de l'Aviation Civile (STAC) of France, the Federal Ministry of Transport, Building and Urban Affairs (BMVBS-LS11) and Federal Waterways and Shipping Administration (WSV) of Germany, the Civil Aviation Authority (CAA) of the United Kingdom, and the like.

The particular standards may have certain design requirements such that the wireless beacon light 102 emit light within a certain collimated angle to prevent light pollution, have a certain amount of light output, at a certain amount of power, and the like. For example, the wireless beacon light 102 may emit light along a light emitting axis 110. The collimation of the light may be measured above and below the light emitting axis 110 as shown by the angles 112. Some standards may require the light emitted from the wireless beacon light to be +/−20 degrees along the light emitting axis 110. Some standards may require the wireless beacon light 102 to emit anywhere from 10 candelas of light to 270,000 candelas of light. Some standards may require that the wireless beacon light 102 be powered by anywhere from 2 Watts to hundreds of Watts of power. Notably, luminaires used for general illumination of rooms, or lights used as indicator lights, are not designed to meet any particular standard that is listed above.

In one embodiment, the base 104 may be coupled to a first portion of the structure 106 and the wireless beacon light 102 may be coupled to another portion of the structure 106. However, the wireless beacon light 102 may be coupled adjacent to or next to the base 104. In one example, the base 104, or multiple bases 104 on different portions of the structure 106, may be coupled to the structure 106 first. Then, the structure may be erected at a desired location. Then, the desired number of wireless beacon lights 102 may be coupled to the structure 106.

Since the wireless beacon light 102 is powered via a wireless power transfer system, no wires need to be connected between the base 104 and the wireless beacon light 102. Thus, the deployment of the wireless beacon light 102 may be more efficient and easier. In addition, if the wireless beacon light 102 fails, a technician may easily replace the wireless beacon light 102 without having to disconnect any wires between the wireless beacon light 102 and the base 104. Therefore, the wireless beacon light 102 can be made without any serviceable openings and therefore serviced without breaking any seals.

As noted above, the structures 106 may be very tall structures. Thus, avoiding the need to disconnect wires between the wireless beacon light 102 and the base 104 may be advantageous and safer for the technician that climbs up the structure 106.

Figure 2:
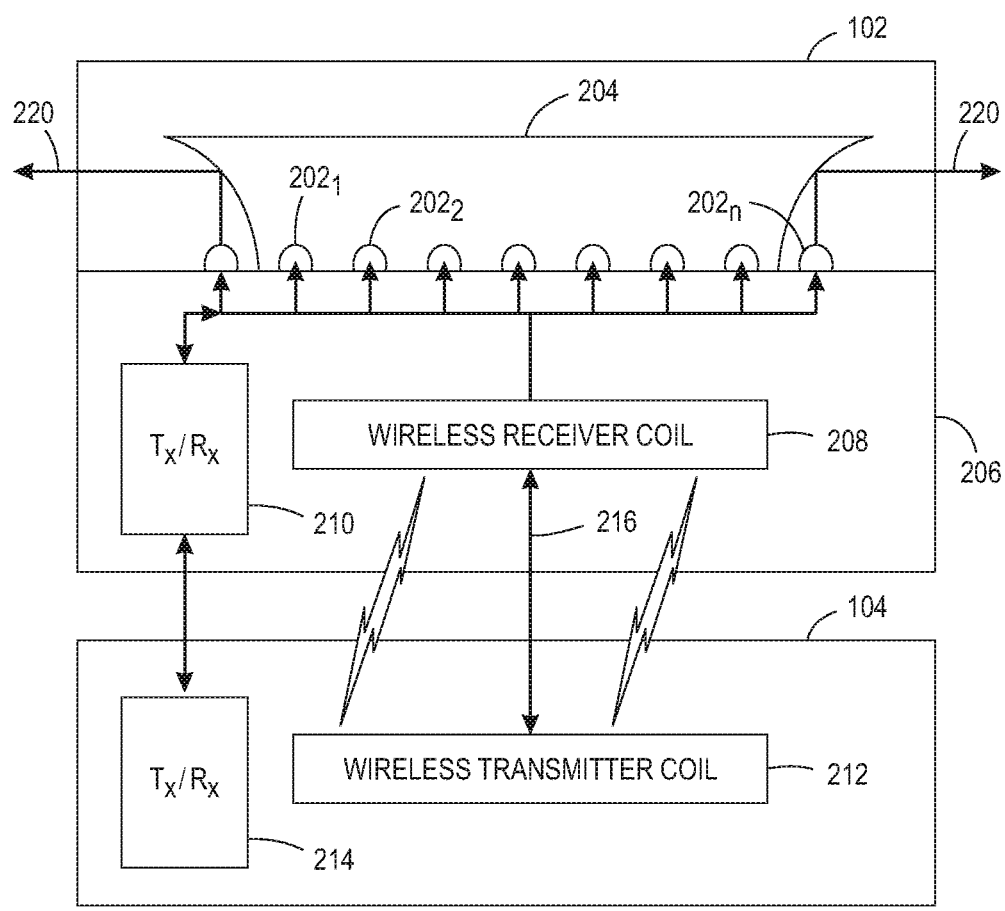
FIG. 2 depicts a block diagram of one embodiment of an example of a base and a warning beacon light having the wireless power transfer.

FIG. 2 illustrates a block diagram of an example of the wireless beacon light 102 and the base 104. In one embodiment, the wireless beacon light 102 may include at least one light redirection component 204 and a plurality of light emitting diodes (LEDs) $202_1$ to $202_n$ (hereinafter also referred to individually as an LED 202 or collectively as LEDs 202).

In one embodiment, the light redirection component 204 may be a reflector that has a parabolic cross-section that is designed to collimate and reflect light emitted from the LEDs 202 at approximately 90 degrees. For example, lines 220 illustrate how light is emitted upward from the LEDs 202 and then redirected by the reflector at approximately 90 degrees in a direction along the horizontal or parallel to the light emitting axis 110 illustrated in FIG. 1. Although the light redirection component 204 is illustrated as a reflector, the light redirection component 204 may also be deployed as an optic or total internal reflection (TIR) lens, and the like.

In one embodiment, the wireless beacon light 102 may include a bottom housing 206. The bottom housing 206 may include some of the electrical, power, and control components of the wireless beacon light 102. In one embodiment, the bottom housing 206 may include a wireless receiver coil 208 and a control/monitor data transceiver (Tx/Rx) 210.

In one embodiment, the base 104 may include a wireless transmitter coil 212 and a control/monitor data transceiver (Tx/Rx) 214. In one embodiment, the wireless receiver coil 208 and the wireless transmitter coil 212 may form part of the wireless power transfer system, referenced above.

The wireless beacon light 102 may be positioned to be within a predefined distance 216 (as shown by the arrow 216 in FIG. 2) from the base 104. In one embodiment, the predefined distance 216 may be a function of a maximum distance at which the wireless transmitter coil 212 may wirelessly transmit power to the wireless receiver coil 208. In one embodiment, the predefined distance 216 may be less than or equal to approximately 30 millimeters (mm).

In one embodiment, the predefined distance 216 may be a distance that is measured between the wireless receiver coil 208 to the wireless transmitter coil 212. In one embodiment, the predefined distance 216 may be a distance that is measured between a bottom surface of the bottom housing 206 and a top surface of the base 104.

Figure 4:
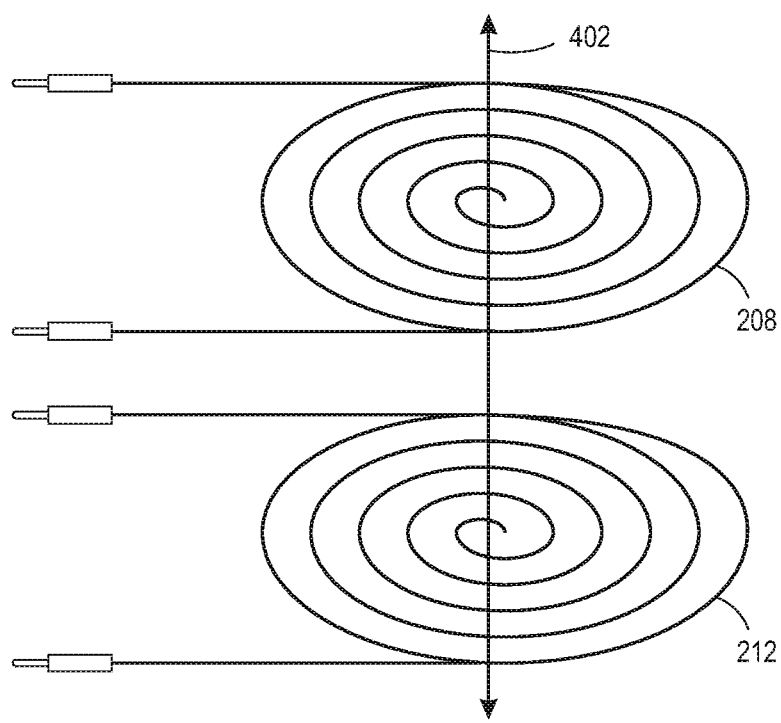
FIG. 4 depicts an isometric view of the receiver and transmitter of the coils for the wireless power transfer.

FIG. 4 illustrates an example implementation of the wireless receiver coil 208 and the wireless transmitter coil 212. In one embodiment, the wireless receiver coil 208 and the wireless transmitter coil 212 may be fabricated from a conductive metal and be deployed as a wire. The wireless receiver coil 208 and the wireless transmitter coil 212 may have a core that is air, ferrite, iron powder, or any other suitable inductor material. The wireless receiver coil 208 and the wireless transmitter coil 212 may also be a standard Qi coil.

The wire may be coiled around and receive current from a power source. An electromagnetic flux 402 may be generated when power is applied to the wireless transmitter coil 212. The electromagnetic flux 402 may power the wireless receiver coil 208.

In one embodiment, the wireless receiver coil 208 and the wireless transmitter coil 212 of the present disclosure may operate at a high frequency. For example, the wireless receiver coil 208 and the wireless transmitter coil 212 may operate at frequencies of approximately 100 kilohertz (khz) to 500 khz. Using the high frequency, the wireless receiver coil 208 and the wireless transmitter coil 212 may perform an air core. Thus, unlike a conventional transformer that operates at low frequencies (e.g., 50-60 hertz (hz)) that use an iron core, operating the wireless receiver coil 208 and the wireless transmitter coil 212 at the high frequencies may allow an air core to be used, which may reduce costs.

Referring back to FIG. 2, the Tx/Rx 210 and 214 may provide a half or full duplex (e.g., two-way) communication path between the wireless beacon light 102 and the base 104. The Tx/Rx 210 and 214 may be wireless communication interfaces using any type of wireless communication protocol. For example, the Tx/Rx 210 and 214 may be a nearfield communication module, a Bluetooth radio, a Wi-Fi radio, an optical DATA link, and the like.

In one embodiment, the Tx/Rx 210 and 214 may provide a duplex communication path that may be used to monitor and control the wireless beacon light 102. For example, monitoring the wireless beacon light 102 may include transmitting information from the wireless beacon light 102 such as, operating time, power information (e.g., current or voltages), error messages for a particular LED 202, current status, and the like. The control may include transmitting control signals to the wireless beacon light 102 such as, turning on and off the wireless beacon light 102, changing an operating mode (e.g., constant on, flashing, and the like), sending test signals, and the like.

Figure 3:
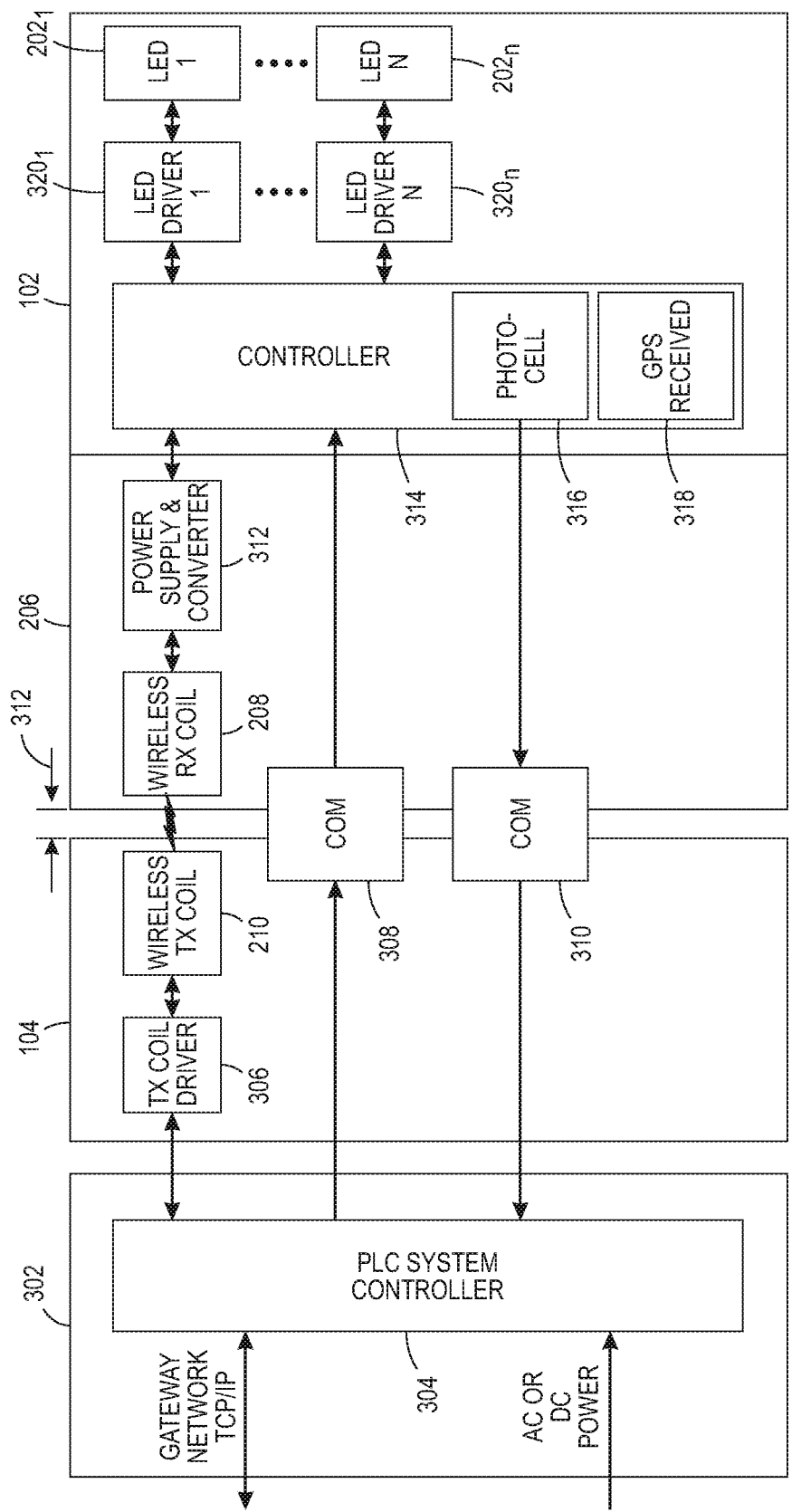
FIG. 3 depicts a functional block diagram of the base and the warning beacon light having the wireless power transfer.

FIG. 3 illustrates a functional block diagram of the warning beacon light 102 and the base 104. In one embodiment, the warning beacon light 102 may include a controller 314. A plurality of LED drivers $320_1$ to $320_n$ (also referred to herein individually as an LED driver 320 or collectively as LED driers 320) may be coupled to the controller 314. The LED drivers 320 may be coupled to a respective LED or LED array $202_1$ to $202_n$. The LED drivers 320 may provide power to each one of the respective LEDs $202_1$ to $202_n$.

In one embodiment, the controller 314 may control operation of the LEDs $202_1$ to $202_n$ via the respective LED driver 320. The controller may be a processor, an application specific integrated controller (ASIC), and the like.

In one embodiment, the controller 314 may also interface with a photocell 316 and a global positioning satellite (GPS) receiver 318. In one example, the photocell 316 may be used to detect daylight such that the controller 314 turns off the LED drivers 320. In one example, the GPS receiver 318 may be used to provide location information to a remotely located central office. The location information may help identify a particular wireless beacon light 102 to the central office when the central office is remotely monitoring and controlling a plurality wireless beacon lights 102 deployed at various different geographic locations on various different structures.

In another example, the GPS receiver 318 may be used to synchronize the Beacon to UTC (Universal Time Code). In this way, multiple Beacons in a wind park cluster can be Flash synchronized. In another example, the GPS receiver 318 can be used to control the day/twilight/night setting in the Beacon by calculating day/twilight/night on a given geographic location (e.g., the so called astronomical clock).

In one embodiment, the bottom housing 206 of the wireless beacon light 102 may include the wireless receiver coil 208 and a power supply and converter 312. The wireless receiver coil 208 may be similar to the wireless receiver coil 208 illustrated in FIGS. 2 and 4 and described above.

In one embodiment, the power supply and converter 312 may be a high frequency rectifier that may convert the power generated in the wireless receiver coil 208 into a low voltage direct current (DC) to power the LED drivers 320. In one example, the power supply and converter 312 may operate at high frequencies of approximately 100 khz-500 khz.

In one embodiment, the power supply and converter 312 may be rectifiers in a two phase and/or or bridge configuration and a power reservoir. The power reservoir may be a capacitor for transforming the high frequency electromagnetic flux generated by the wireless receiver coil 308 into a DC power supply to power the components of the wireless beacon light 102. The DC power may be converted and/or stabilized through a power converter. A forward, flyback, push-pull, half bridge, or full bridge topology switch mode can be used for the power converter. In one embodiment, a simple linear power stabilizing topology may be used for the power converter.

In embodiment, the base 104 may include a transmission coil driver 306 and the wireless transmission coil 212. The wireless transmission coil 212 may be positioned to be within a predefined distance 322 from the wireless receiver coil 208. As discussed above, the predefined distance 322 may be less than 30 mm.

In one embodiment, the transmission coil driver 306 may receive a DC or an alternating current (AC) power supply and convert the power into a high frequency electromagnetic flux. The wireless transmission coil 212 may then transmit the high frequency electromagnetic flux a short distance to the wireless receiver coil 208.

In one embodiment, a communication module 308 and 310 may be deployed between the base 104 and the bottom housing 206 of the wireless beacon light 102. The communication module 308 may provide communication from a programmable logic controller (PLC) system controller 304 to the controller 314 in the wireless beacon light 102. The communication module 310 may allow information or data to be transmitted from the controller 314 back to the PLC system controller 304.

In one embodiment, the communication modules 308 and 310 may be the wireless transceivers 210 and 214 to provide full duplex wireless communications. In one embodiment, the communications modules 308 and 310 may be an optical link. The optical link may be an LED (e.g., both visible light, ultraviolet light, and or infrared light). The receiving part of the optical link may be an LED, a pin diode, a photo diode, a charge coupled device (CCD). The optical link components may be molded into the bottom housing 206 and the base 104 with the wireless receiver coil 208 and the wireless transmission coil 212, respectively.

The communication modules 308 and 310 may be used for both surveillance and control of the wireless beacon light 102. The communication modules 308 and 310 may also be used for remote firmware and/or software upgrades in the controller 314.

In one embodiment, the PLC system controller 304 may be part of a remotely located control box 302 that may be coupled to a plurality of bases 104 and a plurality of wireless beacon lights 102. The PLC system controller 304 may be located on a ground level for easy access and maintenance. The PLC system controller 304 may be located in a separate housing than the base 104 and the wireless beacon light 102.

In one embodiment, the control box 302 may also have a wired or wireless gate network and/or transmission control protocol/Internet protocol (TCP/IP) connection. The PLC system controller 304 may communicate with a remote central office via the gateway network TCP/IP connection.

In one embodiment, the control box 302 may be coupled to a power source. The power source may be an AC or a DC power source that is fed to the transmission coil driver 306 in the base 104, as described above. Thus, the present disclosure provides a wireless beacon light or warning beacon light 102 that can be wirelessly powered. The wireless power transfer system described above, may allow a technician to easily install the wireless beacon light 102 on tall structures without having to connect heavy wires.

Figure 5:
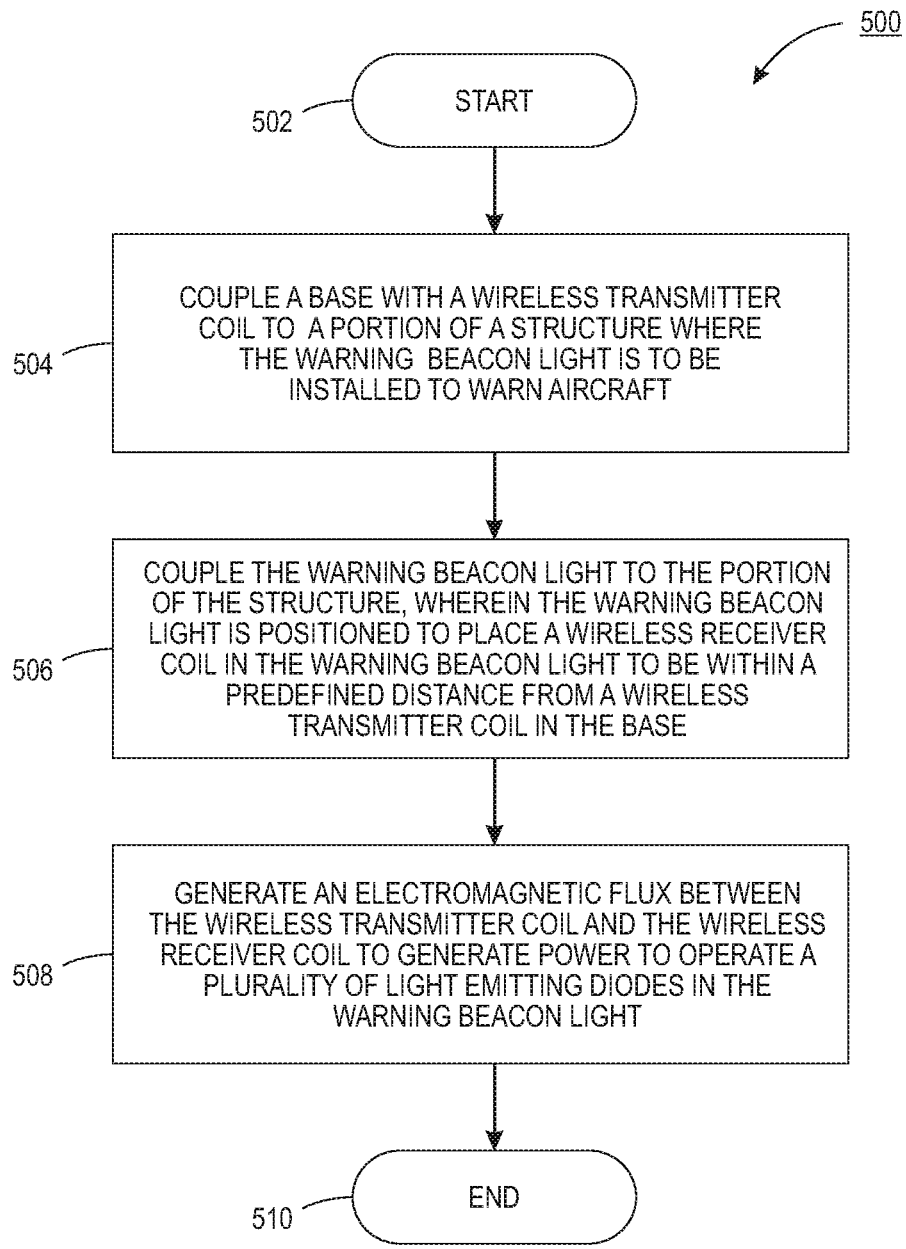
FIG. 5 depicts an example flow diagram of a method for installing a warning beacon light having wireless power transfer.

FIG. 5 illustrates an example flowchart of one embodiment of a method 500 for installing a warning beacon light. The method 500 begins at step 502. At step 504, the method 500 couples a base with a wireless transmitter coil to a portion of a structure where the warning beacon light is to be installed to warn aircraft. For example, the base may be strategically located on various different portions of the structure. Then, the structure may be erected with the parts that include the base. As a result, the base does not need to be separately installed after the structure is erected, which may be cumbersome, difficult, and dangerous.

At block 506, the method 500 couples the warning beacon light to the portion of the structure, wherein the warning beacon light is positioned to place a wireless receiver coil in the warning beacon light to be within a predefined distance from a wireless transmitter coil in the base. In one embodiment, the warning beacon lights may be coupled to the structure as desired. The warning beacon lights may be coupled adjacent to the base. In one embodiment, adjacent to the base may be defined to be within 30 mm of the base. Said another way, the wireless receiver coil in the warning beacon light may be positioned to be within 30 mm of the wireless transmission coil in the base.

Notably, the warning beacon light may be coupled to the structure without having to connect any wires to the base. Thus, the installation and/or maintenance of the warning beacon light on structures that are very high (e.g., over 100 feet tall) may be more efficient and safer.

At block 508, the method 500 generates an electromagnetic flux between the wireless transmitter coil and the wireless receiver coil to generate power to operate a plurality of light emitting diodes in the warning beacon light. For example, a power source may be provided to the base. A transmission coil driver in the base may convert the power into an electromagnetic flux that is transmitted by the wireless transceiver coil. The wireless receiver coil may receive the electromagnetic flux. A power supply and converter in a bottom housing of the warning beacon light may convert the electromagnetic flux into a low voltage DC power source that can power LED drivers. The LED drivers may be powered to turn on respective LED arrays of the warning beacon light.

In one embodiment, the warning beacon lights may be remotely controlled and monitored via a wireless communications connection. For example, the base and the warning beacon light may include an optical link, a Bluetooth radio, a Wi-Fi radio and the like. At block 510, the method 500 ends.

It should be noted that steps, operations, or blocks in FIG. 5 that recite a determining operation, or involve a decision, do not necessarily require that both branches of the determining operation be practiced. In other words, one of the branches of the determining operation can be deemed as an optional step. Furthermore, operations, steps, or blocks of the above described methods can be combined, separated, and/or performed in a different order from that described above, without departing from the example embodiments of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A warning beacon light, comprising:
   at least one light redirection component;
   a plurality of light emitting diodes (LEDs) positioned relative to the at least one light redirection component such that light emitted from the plurality of LEDs is collimated to within a predefined range relative to a light emitting axis; and
   a bottom housing located below the at least one light redirection component, wherein the bottom housing comprises:
   a wireless power transfer system coupled to the plurality of LEDs to provide power to the plurality of LEDs; and
   a power converter coupled to the wireless power transfer system to convert a high frequency electromagnetic flux received from the wireless power transfer system to a direct current (DC) power supply, wherein the power converter comprises a rectifier in a two phase or bridge configuration and a power reservoir and operates at frequencies between 100 kilohertz (kHz) to 500 kHz, the power reservoir comprising a capacitor to transform the high frequency electromagnetic flux into the DC power supply.

2. The warning beacon light of claim 1, wherein the plurality of LEDs is arranged relative to the at least one light redirection component and powered by the wireless power transfer system to emit an amount of light that is in accordance with a standard.

3. The warning beacon light of claim 1, wherein the warning beacon light is coupled to a structure that is at least 100 feet tall.

4. The warning beacon light of claim 1, wherein the wireless power transfer system comprises a receiver coil in a bottom housing, wherein the receiver coil receives power, via an electromagnetic flux, from a transmitter coil in a base coupled to a structure.

5. The warning beacon light of claim 1, further comprising:
   a wireless transceiver to transmit operational data of the warning beacon light and receive control signals.

6. The warning beacon light of claim 1, further comprising:
   a controller to control a power transfer from the wireless power transfer system to the plurality of LEDs and to control monitoring of operations of the plurality of LEDs.

7. The warning beacon light of claim 2, wherein the standard comprises at least one of: a federal aviation administration standard, an international civil aviation organization standard, or an international association of marine aids to navigation and lighthouse authorities standard.

8. A method for installing a warning beacon light, comprising:
   coupling a base with a wireless transmitter coil to a portion of a structure where the warning beacon light is to be installed to warn aircraft;
   erecting the structure at a desired location;
   coupling the warning beacon light to the portion of the structure after the structure is erected at the desired location, wherein the warning beacon light is positioned to place a wireless receiver coil in the warning beacon light to be less than or equal to 30 millimeters from a wireless transmitter coil in the base; and
   generating an electromagnetic flux between the wireless transmitter coil and the wireless receiver coil to generate power to operate a plurality of light emitting diodes in the warning beacon light.

\* \* \* \* \*

UNITED STATES PATENT AND TRADEMARK OFFICE
CERTIFICATE OF CORRECTION

Page 1 of 1

PATENT NO. : 10,962,214 B2
APPLICATION NO. : 16/423991
DATED : March 30, 2021
INVENTOR(S) : Schmidt It is certified that error appears in the above-identified patent and that said Letters Patent is hereby corrected as shown below:

In the Specification

Column 3, Line 13 (Approx.), delete "l'Aviation" and insert -- l'Aviation --.

Column 6, Line 36, delete "and or" and insert -- and/or --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*